United States Patent
Vogt-Birnbrich et al.

[11] Patent Number: 5,908,895
[45] Date of Patent: Jun. 1, 1999

[54] AQUEOUS DISPERSION OF SILANE-FUNCTIONAL POLYURETHANE RESINS, COATING COMPOSITIONS AND USE THEREOF

[75] Inventors: Bettina Vogt-Birnbrich, Solingen; Armin Göbel, Wetter; Wilfried Collong, Wermelskirchen; Birgit Kleuser, Wetter, all of Germany

[73] Assignee: Herberts Gesellschaft Beschrankter Haftung, Wuppertal, Germany

[21] Appl. No.: 08/879,971

[22] Filed: Jun. 20, 1997

[30] Foreign Application Priority Data

Jun. 22, 1996 [DE] Germany .......................... 196 24 972

[51] Int. Cl.$^6$ .............................. C08J 3/00; C08K 3/20; C08L 75/00; C08L 83/00
[52] U.S. Cl. ................ 524/591; 427/372.2; 427/385.5; 524/539; 524/588; 524/839; 524/840; 528/28
[58] Field of Search .................. 524/539, 588, 524/591, 839, 840; 528/28; 427/372.2, 385.5

[56] References Cited

U.S. PATENT DOCUMENTS

| | | | |
|---|---|---|---|
| 5,004,779 | 4/1991 | Blum | 524/591 |
| 5,041,494 | 8/1991 | Franke | 524/588 |
| 5,681,622 | 10/1997 | Vogt-Birnbrich | 524/588 |

FOREIGN PATENT DOCUMENTS

| | | |
|---|---|---|
| 0 315 006 A2 | 5/1989 | European Pat. Off. . |
| 0 379 007 A2 | 7/1990 | European Pat. Off. . |
| 44 13 562 | 10/1995 | Germany . |
| WO94/03511 | 2/1994 | WIPO . |
| WO94/03512 | 2/1994 | WIPO . |

*Primary Examiner*—Patrick D. Niland
*Attorney, Agent, or Firm*—Pillsbury Madison & Sutro LLP

[57] ABSTRACT

Aqueous dispersion of silane-functional polyurethane resins having a number average molecular weight of 10000 to 500000 and a silicon content of 1 to 30 mmol per 100 g of resin solids obtainable by reacting (A) adducts containing NCO groups, which adducts are obtainable by reacting
  a) one or more compounds having at least one ionic or ionisable and/or hydrophilic nonionic group, and more than one isocyanate-reactive group with
  b) one or more organic diisocyanates,
(B) with polyesters having an OH value of 150 to 300 mg of KOH/g and more than three OH groups per molecule, which are obtainable by reacting
  c) polyalcohols with
  d) polycarboxylic acids and
  e) monofatty acids
(C) optionally with linear polyesters having an OH value of 40 to less than 150 mg of KOH/g, which contain no monofatty acids, and
(D) with organic polyisocyanates, wherein at least a proportion of the polyisocyanates has at least one functional group $R^1OSi\equiv$ in which
$R^1$ means $C_1$ to $C_8$ alkyl or $-C(O)R^2$ and $R^2$ means $C_1$ to $C_{10}$ alkyl,
and converting the reaction product into an aqueous dispersion.

12 Claims, No Drawings

AQUEOUS DISPERSION OF SILANE-FUNCTIONAL POLYURETHANE RESINS, COATING COMPOSITIONS AND USE THEREOF

FIELD OF THE INVENTION

This invention relates to aqueous polyurethane dispersions which are in particular suitable as the hydroxy-functional component in isocyanate-crosslinking binder systems. The invention moreover relates to coating compositions containing these polyurethane dispersions and to the use thereof for the production of multi-layer lacquer coatings for automotive and industrial lacquer coating applications.

BACKGROUND OF THE INVENTION

Many water-borne polyurethane dispersions chain-extended in various manners are known, which, by virtue of their excellent properties, are used inter alia as binders in water-based lacquers. Appropriately modified water-borne polyurethane dispersion are, however, also used as the hydroxy-functional component in isocyanate-crosslinking two-component clear or topcoat lacquers. However, isocyanate-crosslinking, two-component systems based on water-borne polyurethane dispersions in particular do not fulfil in all respects the requirements placed upon a multi-layer coating structure, in particular in automotive lacquer coating.

WO-A-94/03511 and WO-A-94/03512, for example, thus describe coating compositions based on polyisocyanates and water-borne OH-functional polyurethane resins. The polyurethane resins are obtained by separately producing an NCO-functional preadduct from organic acid having isocyanate-reactive groups and diisocyanates, together with an OH-functional pre-condensation product and then reacting the two-components. The disadvantages of these two-component systems are their unsatisfactory sag resistance and inadequate resistance to chemicals and petrol.

DE-A-44 13 562 describes aqueous polyurethane dispersions having a content of 2 to 150 mmol of siloxane linkages per 100 g of solid resin. The polyurethane dispersions are obtained by chain-extending a polyurethane prepolymer with siloxane groups by hydrolysis. The polyurethane prepolymer is obtained by reacting an NCO-functional polyurethane prepolymer with aminosilanes. The polyurethane dispersions are used in aqueous coating compositions as the sole binder or in combination with blocked polyisocyanates or formaldehyde condensation resins as the crosslinking agent. Two-component coating compositions based on the stated polyurethane dispersions and based on unblocked polyisocyanates require improvement with regard to sag resistance and blistering, especially in thick coats.

SUMMARY OF THE INVENTION

The object of the present invention is to provide aqueous polyurethane dispersions which, as the binder component in isocyanate-crosslinking, two-component systems, give rise to coating compositions exhibiting elevated sag resistance, absence of blistering and good resistance to chemicals, petrol and humid storage.

This object is achieved by the provision of aqueous dispersions of one or more polyurethane resins modified by silane groups having a number average molecular weight (Mn) of 10000 to 500000 and a silicon content, calculated as elemental silicon, of 1 to 30 mmol per 100 g of resin solids, wherein the aqueous polyurethane dispersions are obtainable by reacting (A) adducts containing NCO groups, which adducts are obtainable by reacting
 a) one or more compounds having at least one ionic or ionisable and/or hydrophilic nonionic group, and more than one isocyanate-reactive group with
 b) one or more organic diisocyanates,
(B) with one or more polyesters having an OH value of 150 to 300 mg of KOH/g and more than three OH groups per molecule, which are obtainable by reacting
 c) one or more polyalcohols with
 d) one or more polycarboxylic acids and
 e) one or more monofatty acids
(C) optionally with one or more linear polyesters having an OH value of 40 to less than 150 mg of KOH/g, which contain no monofatty acids, and
(D) with one or more organic polyisocyanates, wherein at least a proportion of the polyisocyanates has at least one functional group $R^1OSi\equiv$ and optionally with one or more monoisocyanates having at least one functional group $R^1OSi\equiv$, in which $R^1$ means $C_1$ to $C_8$ alkyl or $-C(O)R^2$ and $R^2$ means $C_1$ to $C_{10}$ alkyl, and converting the optionally neutralised reaction product into an aqueous dispersion by adding water.

The dispersions according to the invention preferably contain 15 to 30 wt. %, particularly preferably 15 to 25 wt. % of component (A), 30 to 80 wt. %, particularly preferably 50 to 80 wt. % of component (B), 0 to 40 wt. %, particularly preferably 0 to 20 wt. % of component (C) and 4 to 40 wt. %, particularly preferably 5 to 15 wt. % of component (D); the weight percentages of (A), (B), (C) and (D) each here relate to solids weight and add up to 100 wt. %.

The polyurethane resins according to the invention preferably have a number average molecular weight (Mn) of 15000 to 100000. The silicon content thereof, calculated as elemental silicon, is preferably 2 to 20, particularly preferably 3 to 15 mmol per 100 g of resin solids. The OH value thereof is preferably 30 to 200 mg of KOH/g, particularly preferably 50 to 120 mg of KOH/g. Adducts (A) containing NCO groups are used to produce the aqueous polyurethane dispersions according to the invention. Components a) which may be considered for the production of the adducts (A) containing NCO groups are, for example, low molecular weight compounds containing more than one, preferably two, isocyanate-reactive groups and at least one ionic group, ionisable group and/or hydrophilic, nonionic group. Ionisable groups are functional groups, such as acid and base groups, which may be converted into ionic groups by neutralisation with bases or acids. Anionic or groups capable of forming anions are preferred. Acidic groups capable of forming anions which may be considered are, for example, carboxyl, phosphoric acid and sulphonic acid groups. Carboxyl groups are preferred. Basic groups convertible into cations which may be considered are, for example, primary, secondary and tertiary amino groups and cationic groups which may be considered are onium groups, such as quaternary ammonium, phosphonium and/or tertiary sulphonium groups. Suitable isocyanate-reactive groups are in particular hydroxyl groups and primary and secondary amino groups.

Compounds which may preferably be considered as component a) are those containing carboxyl and hydroxyl groups. Examples of such compounds are hydroxyalkanecarboxylic acids, in particular of the general formula:

$(HO)_xQ(COOH)_y$ in which

Q represents a linear or branched alkylene residue having 1 to 12 C atoms and x and y each mean 1, 2 or 3. Examples of these compounds are citric acid and tartaric acid.

Preferred carboxylic acids are those in which x=2 and x=1, namely dihydroxylalkanoic acids.

Examples of these compounds which are usable according to the invention are described in US-A-3 412 054. A preferred group of dihydroxyalkanoic acids are alpha,alpha-dimethylolalkanoic acids of the general formula $$Q'-\underset{CH_2OH}{\underset{|}{\overset{CH_2OH}{\overset{|}{C}}}}-COOH$$

in which Q' is hydrogen or $C_1$–$C_8$ alkyl. alpha,alpha-Dimethylolpropionic acid and alpha,alpha-dimethylolbutyric acid are preferred.

Further examples of dihydroxyalkanoic acids which may be 20 used are dihydroxypropionic acid, dimethylolacetic acid, dihydroxysuccinic acid or dihydroxybenzoic acid. The polyhydroxy acids obtainable by oxidising monosaccharides are also suitable, for example gluconic acid, saccharic acid, mucic acid and glucuronic acid.

Further compounds usable as component a) are acids containing amino groups, for example alpha,alpha-diaminovaleric acid, 3,4-diaminobenzoic acid, 2,4-diaminotoluene-5-sulphonic acid and 4,4-diaminodiphenyl ether sulphonic acid.

Component a) may also comprise compounds containing hydroxyl groups and having nonionic hydrophilic groups. Nonionic hydrophilic groups are, for example, polyether chains having incorporated ethylene oxide units. These are compounds having one or two isocyanate-reactive hydrogen atoms, which for example bear polyether chains containing ethylene oxide units as side chains, or mixtures thereof.

Examples of such compounds are polyols containing polyether chains having incorporated ethylene oxide units.

Any desired organic diisocyanates may be used as component b) for the production of the preadducts containing NCO groups.

These may be aliphatic, cycloaliphatic or aromatic as well as sterically hindered diisocyanates. Diisocyanates also containing ether or ester groups may, for example, also be used. Examples of suitable diisocyanates are trimethylene diisocyanate, tetramethylene diisocyanate, pentamethylene diisocyanate, hexamethylene diisocyanate, propylene diisocyanate, ethylene diisocyanate, 2,3-dimethylethylene diisocyanate, 1-methyltrimethylene diisocyanate, 1,3-cyclopentylene diisocyanate, 1,4-cyclohexylene diisocyanate, 1,2-cyclohexylene diisocyanate, 1,3-phenylene diisocyanate, 1,4-phenylene diisocyanate, 2,4-tolylene diisocyanate, 2,6-tolylene diisocyanate, 1-isocyanatomethyl-5-isocyanato-1,3,3-trimethylcyclohexane, bis-(4-isocyanatocyclohexyl)-methane, bis-(4-isocyanatophenyl)methane, norbornane diisocyanate, 4,4-diisocyanatodiphenyl ether, 1,5-dibutyl-pentamethylene diisocyanate, tetramethylxylylene diisocyanate, 2,3-bis-(8-isocyanatooctyl)-4-octyl-5-hexyl-cyclohexane, 3(4)-isocyanatomethyl-1-methylcyclohexyl isocyanate and/or 2,6-diisocyanatomethyl caproate.

Non-yellowing and/or sterically inhibited isocyanates are preferably used, in particular those having 4 to 25, preferably 6 to 16 C atoms, which contain in alpha position relative to the NCO group one or two linear, branched or cyclic alkyl groups having 1 to 12, preferably 1 to 4 C atoms. The backbone may consist of an aromatic or alicyclic ring or of an aliphatic, linear or branched C chain having 1 to 12 C atoms. Examples of such compounds are isophorone diisocyanate, bis-(4-isocyanatocyclohexyl)-methane, 1,1,6,6-tetramethylhexamethylene diisocyanate, 1,5-dibutylpentamethylene diisocyanate, 3(4)-isocyanatomethyl-1-methylcyclohexyl isocyanate, p- and m-tetramethyl-xylylene diisocyanate and/or the corresponding hydrogenated homologues.

Hydroxy-functional, fatty acid-modified polyesters (B) are used in the production of the aqueous polyurethane dispersions according to the invention.

The hydroxy-functional, fatty acid-modified polyesters have an OH functionality of greater than 3 and an OH value of 150 to 300, particularly preferably of 180 to 240 mg of KOH/g. They have a preferred monofatty acid content of 10 to 50 wt. %, relative to the total polyester.

Components c) which may be considered for the production of the hydroxy-functional, fatty acid-modified polyesters are conventional polyalcohols known for the production of polyesters. These are, for example, aliphatic, cycloaliphatic and/or araliphatic polyalcohols having 1 to 15, preferably 1 to 6 C atoms, and having 1 to 6, preferably 1 to 4 OH groups attached to non-aromatic C atoms per molecule. Examples of such polyalcohols are glycols such as ethylene glycol, 1,2- and 1,3-propanediol, 1,2-, 1,3- and 1,4-butanediol, 2-ethylene-1,3-propanediol, neopentyl glycol, 2,2-trimethyl-1,2-pentanediol, 1,6-hexanediol, 1,2- and 1,4-cyclohexanediol, 1,2- and 1,4-bis-(hydroxymethyl) cyclohexane, adipic acid bis-(ethylene glycol esters), ether alcohols, such as di- and triethylene glycol, dipropylene glycol, dimethylolpropionic acid, alkoxylated bisphenols having two $C_2$–$C_3$ alkoxy groups per molecule, perhydrogenated bisphenols, 1,2,4-butanetriol, 1,2,6-hexanetriol, trimethylolethane, trimethylolpropane, trimethylolhexane, glycerol, pentaerythritol, dipentaerythritol, sorbitol. Preferably used alcohols are glycerol, trimethylolpropane, neopentyl glycol and pentaerythritol.

A proportion of chain-terminating monohydric alcohols may also be used, for example those having 1 to 8 C atoms per molecule, such as propanol, butanol, cyclohexanol, n-hexanol, benzyl alcohol, hydroxypivalic acid.

Component d) used for the production of the OH-functional, fatty acid-modified polyesters (B) comprises, for example, the polycarboxylic acids conventionally used in the production of polyesters or the esterifiable derivatives thereof. These may be aliphatic, cycloaliphatic and/or aromatic dicarboxylic acids having 4 to 36 atoms, which may be of a linear or branched structure. They are preferably dicarboxylic acids having 4 to 12 C atoms per molecule. Examples of suitable dicarboxylic acids and the derivatives thereof are phthalic anhydride, isophthalic acid, terephthalic acid, dimethyl terephthalate, tetrahydro- and hexahydrophthalic anhydride, alkylsuccinic anhydride, succinic acid, glutaric acid, sebacic acid, azelaic acid, adipic acid, cyclohexanedicarboxylic acid, norbornane-dicarboxylic acid, dimer fatty acids, pyromellitic anhydride, fumaric acid, maleic acid and the anhydrides thereof. A proportion of more highly functional polycarboxylic acids is preferably used in order to obtain a branched polyester. Examples of more highly functional polycarboxylic acids or the anhydrides thereof are trimellitic acid, trimellitic anhydride, pyromellitic acid and pyromellitic anhydride.

Components e) which may be considered for the production of the hydroxy-functional fatty acid-modified polyester are, for example, aliphatic or aromatic monocarboxylic acids having 6 to 35 C atoms. The monocarboxylic acids may be saturated or unsaturated. Examples of suitable saturated monocarboxylic acids are 2-ethylhexanoic acid, isononanoic acid, versatic acid, neodecanoic acid, dodecanoic acid, stearic acid, palmitic acid, coconut oil fatty acid or hydrogenated technical fatty acids or fatty acid mixtures.

Examples of unsaturated monocarboxylic acids of the appropriate chain length are soya oil fatty acid, castor oil fatty acid, sorbic acid, peanut oil fatty acid, tall oil fatty acid and dehydrated castor acid. Saturated aliphatic fatty acids are preferably used.

The OH-functional, fatty acid-modified polyesters (B) may also be used in combination with other OH-functional linear polyesters C) containing no monofatty acids. Preferred polyesters in this case are those having a lower OH value than the fatty acid-modified polyesters (B), namely OH values of 40 to below 150 mg of KOH/g; the average OH functionality thereof is preferably 2.

Organic polyisocyanates (D) are also used to produce the aqueous polyurethane dispersions according to the invention, wherein at least a proportion of the polyisocyanates has a functional group $R^1OSi\equiv$, in which $R^1$ means $C_1$ to $C_8$ alkyl or $-C(O)R^2$ and $R^2$ means $C_1$ to $C_{10}$ alkyl.

The polyisocyanates are preferably diisocyanates. Any desired organic diisocyanates may be used as the diisocyanates. The diisocyanates may be aliphatic, cycloaliphatic or aromatic as well as sterically hindered, as have already been described above for component b).

According to the invention, at least a proportion of the preferably used diisocyanates comprises diisocyanates modified with at least one functional group $R^1OSi\equiv$. Preferably, conventional organic diisocyanates, for example as described above for component b), are present as a mixture with diisocyanates functionalised with $R^1OSi\equiv$.

The diisocyanates functionalised with at least one group $R^1OSi\equiv$ are, for example, reaction products prepared from one or more polyfunctional isocyanates, preferably trifunctional isocyanates and one or more compounds having at least one group $R^1OSi\equiv$ and having at least one isocyanate-reactive group. These compounds are, for example, of the general formula $$[(H-X-)_nR]_aSi(OR^1)_b(R^3)_c \qquad (I)$$

in which

X means O, S, NH or $NR^4$, preferably NH or $NR^4$ R means a difunctional, trifunctional or tetrafunctional, preferably difunctional, organic residue having a molecular weight of 13 to 500, preferably alkylene or aralkylene having 1 to 12 C atoms, particularly preferably alkylene having 1 to 12 C atoms, $R^1$ means $C_1$ to $C_8$ alkyl or $C(O)R^2$, preferably $C_1$ to $C_4$ alkyl, $R^2=R^3$ and means $c_1$ to $C_{10}$ alkyl, wherein $R^2$ and $R^3$ may be identical or different, $R^4$ means $C_1$–$C_8$ alkyl, a means 1, 2 or 3, preferably 1, b means 1, 2 or 3, preferably 2 or 3, c means 0, 1 or 2, n means 1 to 3, preferably 1 or 2, particularly preferably 1, wherein two or more residues $R^1$, $R^2$ and $R^3$ may be identical or different and in which the sum of a plus b plus c equals 4.

The compounds of the general formula (I) are silane derivatives which have groups of the type $(H-X-)_nR-$ containing active hydrogen capable of addition. Amine groups are preferred as functional groups HX— containing active hydrogen. n has values of 1 to 3, with n preferably assuming a value of 1. Residue R is a difunctional to tetrafunctional, preferably difunctional, organic residue, which may bear chemically inert groups or substituents, for example having a molecular weight of 13 to 500. Residue R is preferably a difunctional alkylene or aralkylene having 1 to 12 C atoms. An alkylene residue having 1 to 12 C atoms is particularly preferred as residue R.

The silane derivative of the general formula (I) moreover contains 1 to 3, preferably 2 or 3, groups —$OR^1$ attached to silicon, wherein $R^1$ preferably means $C_1$ to $C_8$ alkyl.

Preferred examples of compounds (I) which may be mentioned are beta-aminoethyltriethoxysilane, gamma-aminopropyltri-ethoxysilane, gamma-aminopropyltrimethoxysilane, gamma-aminopropylethyldiethoxysilane, gamma-aminopropylphenyl-diethoxysilane, gamma-aminopropyltrimethoxysilane, delta-aminobutyltriethoxysilane, delta-aminobutylethyldiethoxysilane, N-(2-aminoethyl-3-aminopropyl)trimethoxysilane, N-2-aminoethyl- 3-aminopropyl-tris(2-ethylhexoxy)silane, 6-(aminohexylaminopropyl)trimethoxysilane, N-aminoethyl-3-aminopropylmethyldimethoxysilane.

In the reaction of the polyfunctional, preferably trifunctional, isocyanates with compounds of the general formula (I), the HX groups of the compound I are completely consumed. The isocyanate groups and HX groups are preferably reacted together stoichiometrically in a ratio of 3:1.

The polyfunctional, preferably trifunctional, isocyanates may be obtained from diisocyanates in the conventional manner. The corresponding trimerisation products of the conventional diisocyanates already described or the reaction products thereof with water or polyols, such as for example trimethylolpropane and glycerol, may, for example, be used. One development of the invention involves additionally modifying at least a proportion of the silane-modified diisocyanates with further monofunctional compounds containing isocyanate-reactive groups. These additionally modified diisocyanates are obtained, for example, by simultaneously reacting polyfunctional, preferably trifunctional isocyanates with compounds of the general formula (I) and further monofunctional compounds containing isocyanate-reactive groups.

Examples of such monofunctional, isocyanate-reactive compounds are compounds having hydroxyl groups, primary or secondary amino groups and a (cyclo)aliphatic linear or branched hydrocarbon residue having 5 to 30 C atoms, preferably having 8 to 18 C atoms. Long-chain monofatty alcohols or monofatty amines are preferably used. Examples of these are n-hexyl alcohol, n- or iso-octyl alcohol, isononanol, lauryl alcohol, cetyl alcohol, stearyl alcohol, dodecyl alcohol, n-hexylamine, n-octylamine, laurylamine.

When the polyfunctional isocyanates are reacted with compounds of the formula (I) and optionally further monofunctional compounds containing isocyanate-reactive groups, a proportion of monoisocyanates modified with at least one group $R^1OSi\equiv$ may also be obtained.

The reaction of components (A), (B), (C) and (D) to yield the silane-functional polyesterurethane according to the invention proceeds in an anhydrous medium, for example at temperatures of 50 to 100° C. The reaction may be performed without solvents or it may be performed in organic solvents familiar per se to the person skilled in the art for the synthesis of polyurethane. Water-miscible or water-immiscible solvents may be used as the solvent. In general, it is advantageous to use those solvents which may be removed at any stage of the production of the PU dispersion according to the invention (for example after the completion thereof), for example by distillation, optionally under reduced pressure.

Examples of suitable solvents are ketones, for example acetone, methyl ethyl ketone, methyl isobutyl ketone; N-alkylpyrrolidones, such as for example N-methylpyrrolidone; ethers, such as for example diethylene glycol dimethyl ether, dipropylene glycol dimethyl ethers, or also cyclic urea derivatives, such as for example 1,3-dimethyl-3,4,5,6-tetrahydro-2(1H)-pyrimidinone.

The reaction of components (A), (B), (C) and (D) to yield the silane-functional polyesterurethane according to the invention may proceed in various manners. The reaction may, for example, be performed in such a manner that a preadduct (A) containing NCO groups and a fatty acid-modified, OH-functional polyester (B) and optionally a linear polyester (C) are initially produced. Components (A), (B) and optionally (C) may then be reacted together. The reaction is performed in a quantity ratio such that the OH groups of the polyester (B) and (C) are present in excess relative to the NCO groups of the preadduct (A). The equivalent ratio of OH groups to NCO groups is preferably 3:1 to 1.1:1.

The preadducts (A) containing NCO groups may, for example, be reacted with the hydroxy-functional polyesters (B) and (C) in a melt or in anhydrous organic solvents which do not react with isocyanate groups. The reaction may proceed, for example, at temperatures of 60 to 160° C., optionally with the addition of conventional basic and/or metallic catalysts. The OH-functional polyester containing urethane groups arising from this reaction process may be reacted with the organic polyisocyanates at least partially modified with $R^1OSi\equiv$ groups.

The polyurethanes according to the invention may, however, be produced by simultaneously reacting components (A), (B), optionally (C) and (D). It is also optionally possible to proceed by first producing component (D) from its individual components and then adding components (A) and (B), optionally (C).

The polyurethanes according to the invention are produced by reacting the individual components together in such quantities relative to each other that the binder qualities desired by the person skilled in the art are obtained, such as for example dispersibility in water, viscosity behaviour, film-forming characteristics, storage stability. All in all, the quantities of the individual components are preferably selected and the reaction controlled in such a manner that the polyurethane resin contains 1 to 30, particularly preferably 2 to 20 mmol of silicon per 100 g of solid resin, preferably has a number average molecular weight (Mn) of 15000 to 100000, preferably has a hydroxyl value of 30 to 200, particularly preferably of 50 to 120 mg of KOH/g, relative to solid resin, and preferably has a content of ionic, ionisable and/or hydrophilic groups of 5 to 200 mEq per loo g of solid resin, preferably as well as an acid value of 10 to 40 mg of KOH/g.

Once components (A), (B), (C) and (D) have reacted to yield the polyurethane resin, the reaction product is converted into an aqueous dispersion by adding water and optionally removing any solvent present by distillation.

The polyurethane resin contains ionic groups, ionisable groups and/or hydrophilic nonionic groups in order to ensure adequate dilutability in water. If the polyurethane resin contains ionisable groups, these are partially or entirely converted into the corresponding salts by means of a neutralising agent. This may proceed at any desired point during the synthesis described above. The neutralising agents may, however, also be added together with the principal quantity of water necessary for conversion into the aqueous phase.

Preferred ion-forming groups are those capable of forming anions. Examples of such groups are described above in the synthesis of the polyurethane resin according to the invention. Conversion into anions is then performed using a base, for example an amine, preferably a tertiary amine. Suitable tertiary amines are, for example, trialkylamines, such as trimethylamine, triethylamine, triisopropylamine, tri-n-propylamine and tri-n-butylamine; N-alkylmorpholines, such as N-methylmorpholine and N-ethylmorpholine; N-dialkylalkanolamines, such as N-dimethylethanolamine, N-diethylethanolamine and N-dimethylisopropanolamine and mixtures of at least two of these compounds. It is, however, also possible to use a proportion of one or more polyamines, preferably diamines having primary and/or secondary amino groups, for neutralisation. Examples of such substances are ethylenediamine, 1,4-butanediamine, 3-amino-1-methylaminopropane, 2,2-dimethyl-1,3-propane-diamine, 1,2- and 1,4-cyclohexanediamine, isophorone-diamine, 4,4'-diaminodiphenylmethane and aminoethylethanol-amine.

If the polyurethane resin according to the invention contains cation-forming groups, one or more acids are preferably used for ion formation. Suitable acids are, for example, phosphoric acid or acidic phosphoric acid esters, or organic carboxylic acids such as formic acid, acetic acid, propionic acid, acrylic acid, hydroxycarboxylic acids such as lactic acid, dimethylolpropionic acid or citric acid, or dicarboxylic acids such as malonic acid, glutaric acid or oxalic acid. Mixtures of the acids may also be used. A quaternisation reaction with alkylating agents, such as for example the reaction with alkyl halides or epoxides, is, however, also possible.

The optionally already neutralised polyurethane resin which is in solvent-free form or in the form of an organic solution is converted into the aqueous phase by adding a sufficient quantity of water.

The aqueous polyurethane dispersion may be produced using known processes. For example, it is possible initially to introduce the optionally neutralised resins and to combine them with water with vigorous dispersion. The water phase optionally containing neutralising agent may also be initially introduced and the resin incorporated by stirring. A continuous method is also possible, i.e. resin, water and neutralising agent are simultaneously mixed together homogeneously in known apparatus, for example a rotor/stator mixer or a high pressure homogeniser. If the optionally neutralised resins are initially introduced, the quantity of water necessary for conversion into the aqueous phase may be added over a period of 5 minutes to 4 hours. Formation of the dispersion may generally be promoted by raising the temperature.

This invention furthermore relates to aqueous coating compositions containing the polyurethane dispersions according to the invention and polyisocyanates having free isocyanate groups.

The coating compositions according to the invention may contain one or more further binders in addition to the polyurethane resin dispersions according to the invention. This may be favourable, for example, in order to achieve synergistic effects. Examples of further binders are the conventional film-forming water-soluble or water-borne resins familiar to the person skilled in the art, such as waterborne polyester resins, water-borne polyacrylate resins and/or other water-borne polyurethane resins. The quantity of the added resins may amount, for example, to 0 to 50 wt. % of the entire resin solids content. Particularly preferred quantities are from 0 to 30 wt. %. In this connection, resin solids means the total of all binders excluding the crosslinking agent content.

Polyisocyanates having free isocyanate groups are present as the crosslinking agent in the coating compositions according to the invention. The polyisocyanates are any desired organic polyisocyanates having aliphatically, cycloaliphatically, araliphatically and/or aromatically attached free isocyanate groups. They are liquid at room temperature or liquefied by the addition of organic solvents. At 23° C., the polyisocyanates generally have a viscosity of 1 to 6000 mPa·s, preferably of above 5 and below 3000 mPa·s.

Such polyisocyanates are generally known and are described, for example in DE-A-38 29 587 or DE-A-42 26 243.

The polyisocyanates are preferably polyisocyanates or polyisocyanate mixtures having exclusively aliphatically and/or cycloaliphatically attached isocyanate groups with an average NCO functionality of 1.5 to 5, preferably of 2 to 3.

Particularly suitable polyisocyanates are, for example, "lacquer polyisocyanates" based on hexamethylene diisocyanate, 1-isocyanato-3,3,5-trimethyl-5-isocyanatomethylcyclohexane (IPDI), norbornane diisocyanate and/or bis(isocyanatocyclohexyl)methane and the per se known derivatives of these diisocyanates containing biuret, allophanate, urethane and/or isocyanurate groups, from which, after the production thereof, excess starting diisocyanate has been removed, preferably by distillation, down to a residual content of less than 0.5 wt. %.

Sterically hindered polyisocyanates of the general formula

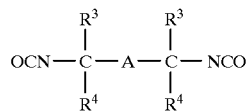

wherein $R^3$ means H or $R^4$, $R^4$ means $C_nH_{2n+1}$, where n=1 to 6, are also very suitable.

The substituents $R^3$ and $R^4$ are either linear or branched, identical or different. The backbone A may consist of a single bond, an aromatic or alicyclic ring or an aliphatic linear or branched C chain having 1 to 12 C atoms.

Examples of these polyisocyanates are 1,1,6,6-tetramethyl-hexamethylene diisocyanate, 1,5-dibutylpentamethyl diisocyanate, p- or m-tetramethylxylylene diisocyanate and the corresponding hydrogenated homologues. These diisocyanates may also be converted in an appropriate manner into more highly functional compounds, for example by trimerisation or by reaction with water or trimethylolpropane.

Aromatic polyisocyanates are also suitable, although less preferred. Examples of these are polyisocyanates based on 2,4-diisocyanatotoluene or mixtures thereof with 2,6-diisocyanatotoluene or based on 4,4'-diisocyanatodiphenylmethane and the trimers thereof.

The coating compositions according to the invention may contain one or more colouring and/or effect pigments and optionally extenders. Suitable pigments and extenders comprise any organic or inorganic pigments and extenders conventional in lacquers. Examples of inorganic or organic colouring pigments are titanium dioxide, micronised titanium dioxide, iron oxide pigments, carbon black, zinc phosphate (corrosion-protection pigment), azo pigments, phthalocyanine pigments, quinacridone or pyrrolopyrrole pigments. Examples of effect pigments are metal pigments, for example made from aluminium, copper or other metals; interference pigments, such as for example metal pigments coated with metal oxide, for example aluminium coated with titanium dioxide, coated micas, such as for example mica coated with titanium dioxide and graphite effect pigments. Examples of extenders are silicon dioxide, barium sulphate, talcum, aluminium silicate and magnesium silicate.

The coating compositions according to the invention may contain further additives. The additives are conventional additives usable in the lacquer sector. Examples of such additives are light stabilisers, for example based on benzotriazoles and HALS compounds, levelling agents based on (meth)acrylic homopolymers or silicone oils, agents influencing rheological properties, such as highly disperse silica or polymeric urea compounds, thickeners, such as partially crosslinked polycarboxylic acid or polyurethanes, antifoaming agents, wetting agents, curing accelerators for the crosslinking reaction of the OH-functional binder with the polyisocyanates, such as for example organic metal salts, such as dibutyltin dilaurate, zinc naphthenate and compounds containing tertiary amino groups such as triethylamine. The additives are used in the conventional quantities familiar to the person skilled in the art. The additives may here be added in the conventional manner or at least a proportion of the additives may be added to the polyurethane resin according to the invention before the polyurethane resin is converted into the aqueous phase. In the latter case, the method described in the hitherto unpublished German patent application P 196 07 672 from the present applicant may be used.

Small quantities of organic solvents, preferably no more than 10 wt. %, may be present in coating compositions according to the invention. The organic solvents are preferably water-miscible. These are conventional lacquer solvents. They may originate from the production of the binders or are added separately. Examples of such solvents are mono- or polyhydric alcohols, for example propanol, butanol, hexanol; glycol ethers or esters, for example diethylene glycol dialkyl ethers, dipropylene glycol dialkyl ethers, in each case having $C_1-C_6$ alkyl, ethoxypropanol, ethylene glycol monobutyl ether; glycols, for example ethylene glycol, propylene glycol and the oligomers thereof, N-methylpyrrolidone, as well as ketones, for example methyl ethyl ketone, acetone, cyclohexanone; aromatic or aliphatic hydrocarbons, for example toluene, xylene or linear or branched aliphatic $C_6-C_{12}$ hydrocarbons. The levelling properties and viscosity of the coating composition may be adjusted by means of selection of the solvent.

Pigmented coating compositions are produced by mixing the individual constituents together and homogenising or grinding them in a conventional manner. The method used may, for example, involve initially mixing a proportion of the polyurethane resins according to the invention with the pigments and/or extenders together with solvents and optionally conventional lacquer additives and grinding them in grinding apparatus. The ground material is subsequently optionally blended with the remaining quantity of binder. It is, however, also possible initially to grind the pigments in a paste resin and then to blend them with the binder component containing hydroxyl groups according to the invention. The paste resins may, for example, be conventional paste resins based on polyester, polyacrylate and/or polyurethane resins. Preferably used polyurethane paste resins are described, for example, in EP-A-0 438 090.

The coating compositions according to the invention are so-called two-component coating compositions, i.e. the two components, the polyisocyanate component and the aqueous polyurethane dispersion are stored separately and mixed together only shortly before application. The lacquer may then, if required, be adjusted to spraying viscosity with water or small quantities of organic solvents.

The coating compositions produced in this manner are particularly suitable for the production of a pigmented or transparent topcoat of an air-drying or force-drying multi-layer coating. They may, however, also be used for surfacer and/or primer layers and as a base lacquer in multi-layer structures. They may be cured at relatively high temperatures of, for example, 80 to 150° C. They are suitable for automotive and industrial lacquer coating, in particular for repair lacquer coating vehicles and vehicle components.

The coating compositions may be applied using known methods, such as for example spraying, dipping, roller application or knife application. The transparent clear lacquer layer may, for example, be applied using the wet-on-wet method onto conventional or aqueous base lacquers, whereupon both layers are cured together, for example for 15 to 30 minutes at, for example, 50 to 150° C., preferably at 50 to 80° C. or the pigmented topcoat lacquer layer or base lacquer layer may be applied onto conventional single or two-component surfacer layers. The coating compositions according to the invention may also be applied as a surfacer layer, for example on conventional primers, for example two-component epoxy primers, and dried at room temperature.

This invention thus also relates to processes for the production of multi-layer coatings or to the use of the coating compositions for the production of multi-layer coatings, wherein the topcoat lacquer, clear lacquer, base lacquer and/or surfacer layers of multi-layer coatings may be prepared using the coating compositions according to the invention.

Coating compositions produced from the aqueous polyurethane dispersions according to the invention and polyisocyanates exhibit elevated sag resistance both in pigmented and unpigmented form. The coating compositions yield blister-free coatings, even with relatively thick coats, for example of greater than 100 μm. In comparison with known aqueous two-component systems, the coatings furthermore exhibit improved resistance to chemicals, humid storage and petrol.

DETAILED DESCRIPTION OF THE PREFERRED EMBODIMENTS

The following Examples are intended to illustrate the invention.

EXAMPLES 1 to 7

Production of a polyurethane dispersion

EXAMPLE 1

255.26 g of acetone, 156.09 g of isophorone diisocyanate and 38.66 g of dimethylolpropionic acid are weighed out. Heat to 60° C. and maintain this temperature until an NCO value of the solution of 7.2% is reached. Cool to 50° C. and add 729.44 g of an isononanoic acid-modified, aliphatic polyester (MW=790 g/mol, OH value=235 mg of KOH/g), 13.77 g of isophorone diisocyanate and 62.3 g of Si precursor A (80% in N-methylpyrrolidone) and maintain at 65° C. until the NCO value of the solution is less than 0.2%. Then cool to 50° C. Add a mixture of 15.5 g of dimethylethanolamine and 4.88 g of isophoronediamine and stir for 15 minutes. Add 1446.06 g of completely deionised water within 10 minutes. Heat to 85° C. and remove acetone by distillation.

Final values

Solids content, 1 h 150° C.=40.0%

Acid value from solids content=18.1 mg of KOH/g

Amine MEQ=19.9

Hydroxyl value from solids content=110 mg of KOH/g

Draining time, 23° C. (DIN 53211-4)=20 seconds

EXAMPLE 2

1210.96 g of acetone, 754.8 g of isophorone diisocyanate and 196.58 g of dimethylolpropionic acid are weighed out and heated to 60° C. Maintain this temperature until an NCO value of the solution of 7.5% is reached. Cool to 50° C. and add 347.47 g of an isononanoic acid-modified, aliphatic polyester (MW=782 g/mol, OH value=236.6 mg of KOH/g), 22.2 g of isophorone diisocyanate and 504.3 g of Si precursor A (80% in N-methylpyrrolidone) and maintain at 65° C. until the NCO value of the solution is less than 0.2%. Then cool to 50° C. Add a mixture of 73.44 g of dimethylethanolamine, 23.12 g of isophoronediamine and 97.7 g of completely deionised water and stir for 15 minutes. Add 6915.13 g of completely deionised water within 10 minutes. Heat to 85° C. and remove acetone by distillation.

Final values

Solids content, 1 h 150° C.=39.6%

Acid value from solids content=18.3 mg of KOH/g

Amine MEQ=21.6

Hydroxyl value from solids content=111 mg of KOH/g

Draining time, 23° C. (DIN 53211-4)=20 seconds

EXAMPLE 3

1271.54 g of acetone, 754.8 g of isophorone diisocyanate and 186.93 g of dimethylolpropionic acid are weighed out and heated to 60° C. Maintain this temperature until an NCO value of the solution of 8.0% is reached. Cool to 50° C. and add 352.43 g of an isononanoic acid-modified, aliphatic polyester (MW=782 g/mol, OH value=236.6 mg of KOH/g), 99.9 g of isophorone diisocyanate. Maintain at 65° C. until the NCO value of the solution is less than 0.2%. Then cool to 50° C. Add 150.5 g of Si precursor A (80% in N-methyl-pyrrolidone) and heat to 65° C. Maintain this temperature until an NCO value of the solution of less than 0.2% is reached. Cool to 50° C. Add a mixture of 74.58 g of dimethylethanolamine, 23.5 g of isophoronediamine and 90.0 g of completely deionised water and stir for 15 minutes. Add 6915.13 g of completely deionised water within 10 minutes. Heat to 85° C. and remove acetone by distillation.

Final values

Solids content, 1 h 150° C.=40.1%

Acid value from solids content=18.5 mg of KOH/g

Amine MEQ=22.2

Hydroxyl value from solids content=112 mg of KOH/g

Draining time, 23° C. (DIN 53211-4)=20 seconds

EXAMPLE 4

251.93 g of acetone, 157.4 g of isophorone diisocyanate and 40.93 g of dimethylolpropionic acid are weighed out and heated to 60° C. Maintain at 60° C. until an NCO value of the solution of 7.5 is reached. Cool to 50° C. and add 723.8 g of an isononanoic acid-modified, aliphatic polyester (MW=782 g/mol, OH value=236.6 mg of KOH/g) and 4.62 g of isophorone diisocyanate. Maintain at 65° C. until the NCO value of the solution is less than 0.2%. Then cool to 50° C. Add 105.0 g of Si precursor A (80% in N-methylpyrrolidone) and heat to 65° C. Maintain this temperature until an NCO value of the solution of less than 0.2% is reached. Cool to 50° C. Add a mixture of 16.46 g of methylethanolamine, 5.18 g of isophoronediamine and 20.34 g of completely deionised water and stir for 15 minutes. Add 1447.2 g of completely deionised water within 10 minutes. Heat to 85° C. and remove acetone by distillation.

Final values

Solids content, 1 h 150° C.=40.0%

Acid value from solids content=18.7 mg of KOH/g

Amine MEQ=23.0

Hydroxyl value from solids content=111 mg of KOH/g

Draining time, 23° C. (DIN 53211-4)=18 seconds

EXAMPLE 5

1210.1 g of acetone, 754.8 g of isophorone diisocyanate and 196.58 g of dimethylolpropionic acid are weighed out. Heat to 60° C. Maintain at 60° C. until an NCO value of the solution of 7.5% is reached. Cool to 50° C. and add 3476.47 g of an isononanoic acid-modified, aliphatic polyester (MW=782 g/mol, OH value=236.6 mg of KOH/g) and 22.2 g of isophorone diisocyanate. Maintain at 65° C. until the NCO value of the solution is less than 0.2%. Then cool to 50° C. Add a mixture of 82.94 g of dimethylethanolamine, 76.11 g of isophoronediamine and 97.7 g of completely deionised water and stir for 30 minutes. Add 504.3 g of Si precursor A (80% in N-methylpyrrolidone) and heat to 65° C. Maintain at 65° C. for 1 hour. Cool to 50° C., then add 6951.13 g of completely deionised water. Heat to 85° C. and remove acetone by distillation.

Final values

Solids content, 1 h 150° C.=40.6%

Acid value from solids content=18.1 mg of KOH/g Amine MEQ=21.3

Hydroxyl value from solids content=111 mg of KOH/g

Draining time, 23° C. (DIN 53211-4)=15 seconds

EXAMPLE 6

1186 g of acetone, 754.8 g of isophorone diisocyanate and 192.83 g of dimethylolpropionic acid are weighed out. Heat to 60° C. and maintain this temperature until an NCO value of the solution of 7.7% is reached. Cool to 50° C. and add 3263.64 g of an isononanoic acid-modified, aliphatic polyester (MW=782 g/mol, OH value=236.6 mg of KOH/g), 22.2 g of isophorone diisocyanate and maintain at 65° C. until the NCO value of the solution is less than 0.2%. Then cool to 50° C. Add 624.66 g of Si precursor B (80% in N-methylpyrrolidone) and react at 65° C. until an NCO value of the solution of less than 0.2% is reached. Cool to 50° C. Then add a mixture of 72.1 g of dimethylethanolamine, 22.7 g of isophoronediamine and 94.83 g of completely deionised water and stir for 15 minutes. Add 6803.2 g of completely deionised water within 10 minutes. Heat to 85° C. and remove acetone by distillation.

Final values

Solids content, 1 h 150° C.=40.0%

Acid value from solids content=18.0 mg of KOH/g

Amine MEQ=22.8

Hydroxyl value from solids content=102 mg of KOH/g

EXAMPLE 7

1125.68 g of acetone, 754.88 g of isophorone diisocyanate and 180.9 g of dimethylolpropionic acid are weighed out into a reaction flask. Heat to 60° C. and maintain this temperature until an NCO value of the solution of 8.4% is reached. Cool to 50° C. Add 3433.8 g of an isononanoic acid-modified, aliphatic polyester (MW=7712 g/mol, OH value=240 mg of KOH/g) and 133.2 g of isophorone diisocyanate and maintain at 65° C. until the NCO value of the solution is less than 0.2%. Then cool to 50° C. Add 830.6 g of Si precursor C (80% in N-methylpyrrolidone). Heat to 65° C. and maintain at this temperature until an NCO value of the solution of less than 0.2% is reached. Cool to 50° C. Then add a mixture of 68.37 g of dimethylethanolamine, 21.56 g of isophoronediamine and 89.93 g of completely deionised water and stir for 15 minutes. Add 7162.52 g of completely deionised water within 10 minutes. Heat to 85° C. and remove acetone by distillation.

Final values

Solids content, 1 h 150° C.=40.0%

Acid value from solids content=87 mg of KOH/g

Production of precursors containing Si Si precursor A 573 g of trimerised hexamethylene diisocyanate are weighed out and heated to 60° C. Then add 97.15 g of dodecanol (96%). Heat to 80° C. and maintain at this temperature until the NCO value is 15.7%. Cool to 60° C. and add 110.5 g of aminopropyltriethoxysilane dropwise within 10 minutes and heat to 80° C. Maintain this temperature until an NCO value of 10.8% is reached. Dilute with 195.2 g of N-methylpyrrol-idone.

Final values

Solids content, 30 min 125° C.=77.4%

NCO value of solution=8.4%

Si precursor B 732 g of tetramethylxylylene diisocyanate, 92.0 g of glycerol and 0.824 g of dibutyltin dilaurate are weighed out. Heat to 80° C. and maintain at this temperature until an NCO value of 15.3% is reached. Then add 206.0 g of N-methylpyrrolidone and cool to 60° C. Add 97.15 g of dodecanol (96%). Heat to 80° C. and maintain at this temperature until the NCO value of the solution is 11.2%. Cool to 60° C. and add 110.5 g of aminopropyltriethoxysilane dropwise within 10 minutes and react at 80° C. until the NCO value is 6.5%. Then add 51.06 g of N-methylpyrrolidone and homogenise.

Final values

Solids content, 30 min 125° C.=81.0%

NCO value of solution=6.1%

Si precursor C 222 g of isophorone diisocyanate are weighed out and heated to 80° C. Then add 221 g of aminopropyltriethoxysilane dropwise. Heat to 80° C. and maintain at this temperature until the NCO value is 9.5%. Dilute with 88.6 g of N-methylpyrrolidone.

Final values

Solids content, 30 min 125° C.=80%

NCO value of solution=7.6%

EXAMPLE 8

Production of clear lacquers (pt. means parts by weight)

Production of stock components 8.1 to 8.7

The following conventional commercial lacquer additives are added in the stated sequence to 500 pt. portions of the dispersions obtained in Examples 1 to 7:12 pt. of ethylene glycol monobutyl ether, 1.9 pt. of a light stabiliser combination of a benzotriazole type UV absorber and a HALS type (HALS=hindered amine light stabiliser) free radical scavenger, 0.56 pt. of a polyurethane thickener and 0.74 pt. of a polysiloxane-based levelling agent. A solids content of 40 wt. % is established with deionised water.

19 pt. of a conventional commercial polyisocyanate based on a hexamethylene diisocyanate trimer (NCO value: 17%) are homogeneously stirred into 100 pt. portions of the stock solutions 8.1 to 8.7 produced above. A viscosity of 20 seconds (DIN 4 cup/23° C.) is then established with deionised water.

EXAMPLE 9 (Comparative Example)

9.1 Production of a comparison binder 1

A comparison binder is produced according to Wo-A-94/03512, Example 4.

9.2 Production of a comparison binder 2

A comparison binder is produced according to DE-A-44 13 562, Example 1.

10 Production of comparison clear lacquers 10.1 and 10.2

The following conventional commercial lacquer additives are added in the stated sequence to 500 pt. portions of the dispersions obtained in 9.1 and 9.2:13 pt. of ethylene glycol monobutyl ether, 2 pt. of a light stabiliser combination of a benzotriazole type UV absorber and a HALS type (HALS= hindered amine light stabiliser) free radical scavenger, 0.6 pt. of a polyurethane thickener and 0.8 pt. of a polysiloxane-based levelling agent. A solids content of 40 wt. % is established with deionised water.

19 pt. of a conventional commercial polyisocyanate based on a hexamethylene diisocyanate trimer (NCO value: 17%) are homogeneously stirred into 100 pt. portions of the stock solutions 10.1 and 10.2 produced above. A viscosity of 20 seconds (DIN 4 cup/23° C.) is then stablished with deionised water.

Application of clear lacquers from Examples 8.1 to 8.7 and 10.1 and 10.2

The clear lacquers obtained are sprayed wet-on-wet to a dry film thickness of 40 to 60 μm onto conventional solvent-based base lacquer layers and, after flashing off for 5 minutes, cured at 60° C. for 30 minutes. The following table shows the technical properties of the lacquers.

|  | Sag limit at | Absence of blistering from |
| --- | --- | --- |
| Example 8.1 | 120 μm | 110 μm |
| Example 8.2 | 100 μm | 90 μm |
| Example 8.3 | 110 μm | 90 μm |
| Example 8.4 | 110 μm | 100 μm |
| Example 8.5 | 100 μm | 90 μm |
| Example 8.6 | 120 μm | 100 μm |
| Example 8.7 | 120 μm | 110 μm |
| Comp. Example 10.1 | 50 μm | 70 μm |
| Comp. Example 10.2 | 40 μm | 80 μm |

Sag limits of 100 to 120 μm and blister-free coatings of 90 to 110 μm are achieved with the coating compositions according to the invention. This constitutes a distinct improvement over comparable conventional coating compositions. With regard to humid storage resistance and interlayer adhesion, the coating compositions according to the invention achieve equally good results as conventional coating compositions.

We claim:

1. Aqueous dispersion of silane-functional polyurethane resins having a number average molecular weight (Mn) of 10000 to 500000 and a silicon content, calculated as elemental silicon, of 1 to 30 mmol per 100 g of resin solids, wherein the aqueous polyurethane dispersions are obtained by reacting (A) adducts containing NCO groups, which adducts are obtained by reacting
   a) one or more compounds having at least one ionic or ionisable and/or hydrophilic nonionic group, and more than one isocyanate-reactive group with
   b) one or more organic diisocyanates,
(B) with one or more polyesters having an OH value of 150 to 300 mg of KOH/g and more than three OH groups per molecule, which are obtained by reacting
   c) one or more polyalcohols with
   d) one or more polycarboxylic acids and
   e) one or more monofatty acids
(C) optionally with one or more linear polyesters having an OH value of 40 to less than 150 mg of KOH/g, which contain no monofatty acids, and
(D) with one or more organic polyisocyanates, wherein at least a proportion of the polyisocyanates has at least one functional group $R^1OSi\equiv$ and optionally with one or more monoisocyanates having at least one functional group $R^1OSi\equiv$, in which
   $R^1$ means $C_1$ to $C_8$ alkyl or $-C(O)R^2$ and
   $R^2$ means $C_1$ to $C_{10}$ alkyl,
   and converting the optionally neutralised reaction product into an aqueous dispersion by adding water.

2. Process for the production of the dispersions according to claim 1, characterised in that (A) adducts containing NCO groups are produced by reacting, in an anhydrous medium,
   a) one or more compounds having at least one ionic or ionisable and/or hydrophilic nonionic group and more than one, isocyanate-reactive group with
   b) one or more organic diisocyanates,
and the resultant adducts are reacted with (B) one or more polyesters having an OH value of 150 to 300 mg of KOH/g and more than three OH groups per molecule, which are obtained by reacting
   c) one or more polyalcohols with
   d) one or more polycarboxylic acids and
   e) one or more monofatty acids
(C) optionally with one or more linear polyesters having an OH value of 40 to less than 150 mg of KOH/g, which contain no monofatty acids, and
(D) with one or more organic polyisocyanates, wherein at least a proportion of the polyisocyanates has at least one functional group $R^1OSi\equiv$ and optionally with one or more monoisocyanates having at least one functional group $R^1OSi\equiv$, in which
   $R^1$ means $C_1$ to $C_8$ alkyl or $-C(O)R^2$ and
   $R^2$ means $C_1$ to $C_{10}$ alkyl,
   whereupon the optionally neutralised reaction product is converted into an aqueous dispersion by adding water.

3. Process according to claim 2, characterised in that the proportions of the reaction components are selected in such a manner that the polyurethane resins have an OH value of 30 to 200 mg of KOH/g, a content of ionic groups, ionisable groups and/or nonionic or non-ionisable hydrophilic groups of 5 to 200 mEq per 100 g of solid resin and an acid value of 10 to 40 mg of KOH/g.

4. Dispersion and process according to claim 1, characterised in that component D) diisocyanates functionalised with at least one group $R^1OSi\equiv$ are reaction products prepared from one or more polyfunctional isocyanates and one or more compounds having at least one group $R^1OSi\equiv$ and having at least one isocyanate-reactive group of the general formula in which X means O, S, NH or $NR^4$, R means a difunctional, trifunctional or tetrafunctional organic residue having a molecular weight of 13 to 500, $R^1$ means $C_1$ to $C_8$ alkyl or $C(O)R^2$, $R^2=R^3$ and means $C_1$ to $C_{10}$ alkyl, wherein $R^2$ and $R^3$ may be identical or different, $R^4$ means $C_1$–$C_8$ alkyl, a means 1, 2 or 3, b means 1, 2 or 3, c means 0, 1 or 2, n means 1 to 3, wherein two or more residues $R^1$, $R^2$ and $R^3$ may be identical or different and in which the sum of a plus b plus c equals 4.

5. Dispersion according to claim 1, characterised in that the polyester (B) has an OH value of 180 to 240 mg of KOH/g and a monofatty acid content of 10 to 50 wt. %, relative to the polyester.

6. Aqueous coating composition containing an aqueous dispersion according to claim 1, optionally with one or more solvents and/or conventional lacquer additives.

7. Coating composition according to claim 6 which contains one or more polyisocyanates having free NCO groups as crosslinking agents.

8. A process for using an aqueous polyurethane dispersion according to claim 1, comprising:

adding the dispersion to at least one member selected from the group consisting of solvents and lacquer additives to form an aqueous coating composition.

9. A process for using an aqueous coating composition according to claim 6, comprising:

applying the composition to a substrate as a pigmented or transparent topcoat lacquer in multi-layer lacquer coatings.

10. A process for using an aqueous coating composition according to claim 6, comprising:

original lacquer coating or repair lacquer coating of industrial articles, motor vehicles or components thereof with the aqueous coating composition.

11. Process according to claim 2, characterised in that component D) diisocyanates functionalised with at least one group $R^1OSi\equiv$ are reaction products prepared from one or more polyfunctional isocyanates and one or more compounds having at least one group $R^1OSi\equiv$ and having at least one isocyanate-reactive group of the general formula in which X means O, S, NH or $NR^4$, R means a difunctional, trifunctional or tetrafunctional organic residue having a molecular weight of 13 to 500, $R^1$ means $C_1$ to $C_8$ alkyl or $C(O)R^2$, $R^2=R^3$ and means $C_1$ to $C_{10}$ alkyl, wherein $R^2$ and $R^3$ may be identical or different, $R^4$ means $C_1$–$C_8$ alkyl, a means 1, 2 or 3, b means 1, 2 or 3, c means 0, 1 or 2, n means 1 to 3, wherein two or more residues $R^1$, $R^2$, and $R^3$, may be identical or different and in which the sum of a plus b plus c equals 4.

12. Process according to claim 2, characterised in that the polyester (B) has an OH value of 180 to 240 mg of KOH/g and a monofatty acid content of 10 to 50 wt. %, relative to the polyester.

* * * * *